United States Patent [19]
Ono

[11] Patent Number: 5,692,773
[45] Date of Patent: Dec. 2, 1997

[54] AIR BAG MODULE WITH BENDABLE BASE FOR MOUNTING COVER

[75] Inventor: Kazumi Ono, Omiya, Japan

[73] Assignee: Kansei Corporation, Omiya, Japan

[21] Appl. No.: 637,422

[22] Filed: Apr. 25, 1996

[30] Foreign Application Priority Data

Apr. 26, 1995 [JP] Japan .................. HEI. 7-102638

[51] Int. Cl.$^6$ .................................. B60R 21/20
[52] U.S. Cl. .................. 280/728.2; 280/728.3
[58] Field of Search ............... 280/728.3, 728.2, 280/731, 730.1, 732, 728.1

[56] References Cited

U.S. PATENT DOCUMENTS

| | | | |
|---|---|---|---|
| 5,092,627 | 3/1992 | Igawa | 280/728.2 |
| 5,195,774 | 3/1993 | Morita | 280/731 |
| 5,201,541 | 4/1993 | Jones et al. | 280/728.2 |
| 5,435,593 | 7/1995 | Hiramitsu et al. | 280/728.2 |
| 5,520,411 | 5/1996 | Lang et al. | 280/728.3 |
| 5,542,693 | 8/1996 | Koide | 280/728.2 |

FOREIGN PATENT DOCUMENTS

| | | |
|---|---|---|
| 195 22 313 | 1/1996 | Germany. |
| 44 34 685 | 4/1996 | Germany. |

*Primary Examiner*—Brian L. Johnson
*Assistant Examiner*—Peter C. English
*Attorney, Agent, or Firm*—Foley & Lardner

[57] ABSTRACT

A base member which is formed into an approximately non-planar shape in a plan view so that the lateral width of the base member is relatively reduced is placed together with the air bag body into an air bag cover. Thereafter, the lateral width of the base member is increased by flattening the base member, so that engaging claws disposed on the base member engage with the air bag cover, thereby joining the base member to the air bag cover.

7 Claims, 7 Drawing Sheets

AIR BAG MODULE WITH BENDABLE BASE FOR MOUNTING COVER

BACKGROUND OF THE INVENTION

1. Field of the Invention

The invention relates to an air bag apparatus for an automobile, and particularly to an air bag apparatus for an automobile which is preferably used as a driver-side air bag apparatus that is to be mounted in a steering unit.

2. Description of the Related Art

First, the structure of a conventional air bag apparatus will be described with reference to FIGS. 1 and 2.

FIG. 1 is an exploded perspective view showing members configuring an air bag apparatus which is modularized and mounted in a steering unit. Reference numeral 1 designates an inflator. The inflator 1 houses a gas generator and a propellant which react with each other to instantly generate a gas, and also a firing device which is energized to generate heat upon a crash of an automobile, thereby causing the gas generator and the propellant to react with each other. Reference numeral 2 designates a box-like base member, 3 designates the air bag body which is to be filled with a gas generated by the inflator 1 so as to instantly inflate (FIG. 1 diagrammatically shows the inflating state), and 4 designates a ring-like retainer having stud bolts 4a which are used for integrally joining the inflator 1, the base member 2, and the air bag body 3 to each other. Reference numeral 5 designates an air bag cover which is made of a resin and has a breakaway groove (not shown) of an approximately H-like shape or the like. When pushed by the inflating pressure of the air bag body 3, the air bag cover is broken along the groove. The air bag body 3 is folded and then mounted together with the inflator 1 in a flange portion 5A on the rear face of the cover, via the base member 2. The cover 5 is disposed in the center portion of a steering wheel (not shown). The dimensions of these components are determined so that the base member 2 is mounted in the flange portion 5A of the air bag cover 5 in a tight manner or without producing play.

Next, the procedure of assembling the conventional air bag apparatus will be described.

First, before or after the air bag body 3 is folded, the retainer 4 is placed in the air bag body 3 through an opening peripheral edge 3A. The four stud bolts 4A protruded from a side face of the retainer 4 are respectively passed through mounting holes 3B formed in the opening peripheral edge 3A of the air bag body 3, from the inside of the air bag body 3. Thereafter, the base member 2 and the inflator 1 are placed in such a manner that the stud bolts 4A passed through the mounting holes 3B are further passed through holes 2A formed in the base member 2 and through holes 1B formed in a flange portion 1A of the inflator 1. Nuts 6 are fastened to protruding ends of the stud bolts 4A, thereby integrally assembling the components, i.e., the retainer 4, the air bag body 3, the base member 2, and the inflator 1 into one unit.

Thereafter, the thus assembled unit is mounted so as to be forcedly pushed in the flange portion 5A formed on the rear face of the air bag cover 5. At this time, the mounting of the assembled unit is conducted while mounting holes 5B formed in the upper, lower, right, and left wall faces of the flange portion 5A are made coincident with mounting holes 2C formed on the upper, lower, right, and left wall faces of a flange portion 2B of the base member 2. A rivet 7 is passed through each pair of the mounting holes 5B and 2C. The rivets 7 are caulked so that the air bag apparatus is assembled as a module as shown in FIG. 2. The air bag apparatus (air bag module) is fixed to the steering wheel through brackets 2D formed on the base member 2.

As described above, the base member 2 is rigid and the dimensions of the base member 2 are set so that the base member 2 is mounted in the flange portion 5A on the rear face of the air bag cover 5 in a tight manner or without producing play. When the assembling parts 1, 2, 3 and 4 are mounted with being forcedly pushed in the flange portion 5A in the process of assembling the conventional air bag apparatus, therefore, there arise such problems that a strong pushing force must be exerted, and that the process of aligning the mounting holes 5B and 2C with each other is required so as to allow the rivets 7 to pass therethrough, thereby lowering the assembly workability. Furthermore, the assembly process requires at least two steps, a first assembly step in which the components of the inflator 1, the base member 2, the air bag body 3, and the retainer 4 are first assembled into one unit, and a second assembly step in which the assembled unit and the air bag cover 5 are joined to each other by using the rivets 7. In the attachment of the air bag cover 5, the riveting process using a number of rivets must be conducted. Therefore, the attachment of the air bag cover requires considerable labor, thereby producing another problem in that the attachment work impairs the productivity and the economical efficiency.

SUMMARY OF THE INVENTION

The invention has been conducted in order to solve these problems of the conventional air bag apparatus. It is an object of the invention to provide air bag apparatus for an automobile in which, in order to facilitate the attachment of a base member into a flange portion of an air bag cover, the shape of the base member in a side view is formed into an approximately non-planar shape, the base member in the state of the approximately non-planar shape is attached into the flange portion, and the base member is then flattened by expanding the base member, thereby enabling the base member and the air bag cover to be joined to each other easily and surely, at a predetermined strength, and without using conventional attaching means such as riveting.

In order to attain the above object, the air bag apparatus for an automobile of the invention is an apparatus in which an opening through which a gas from an inflator is to be introduced is formed in an air bag body, a peripheral edge of the opening is sandwiched by a retainer positioned inside the peripheral edge and a base member positioned outside the peripheral edge, and an air bag cover which is to cover an outside of the air bag body, and the inflator are fixed to the base member, and characterized in that a plurality of engaging portions which are to engage with the base member are formed in an inside of the air bag cover; the base member is bent into an approximately non-planar shape in a side view so that a width between right and left sides is relatively reduced, and comprises engaging claws which are to engage with the engaging portions disposed in the air bag cover, in a side edge of the base member; the base member which cooperates with the retainer to sandwich the air bag body is placed together with the air bag body inside the air bag cover while maintaining the non-planar bent state of the base member, and then the base member is flattened; and the width between right and left sides of the base member is increased by the flattening operation, whereby the engaging claws disposed in the side edge of the base member are caused to be fastened to the engaging portions disposed in the air bag cover.

According to the invention, engaging claws disposed on a base member which engagedly holds an air bag body and has a non-planar shape in a side view is caused to engage with engaging holes formed in the inside of an air bag cover by a simple work in which the base member is flattened after the base member is covered with an air bag cover surrounding the air bag body and the base member, thereby enabling the base member and the air bag body to be integrally joined to each other while maintaining a sufficient joining strength. Therefore, the work of assembling an air bag apparatus can be simplified, whereby the economical efficiency of the product is enhanced.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Hereinafter, a description will be given in more detail of embodiments of the present invention with reference to the accompanying drawings.

Figure 1:
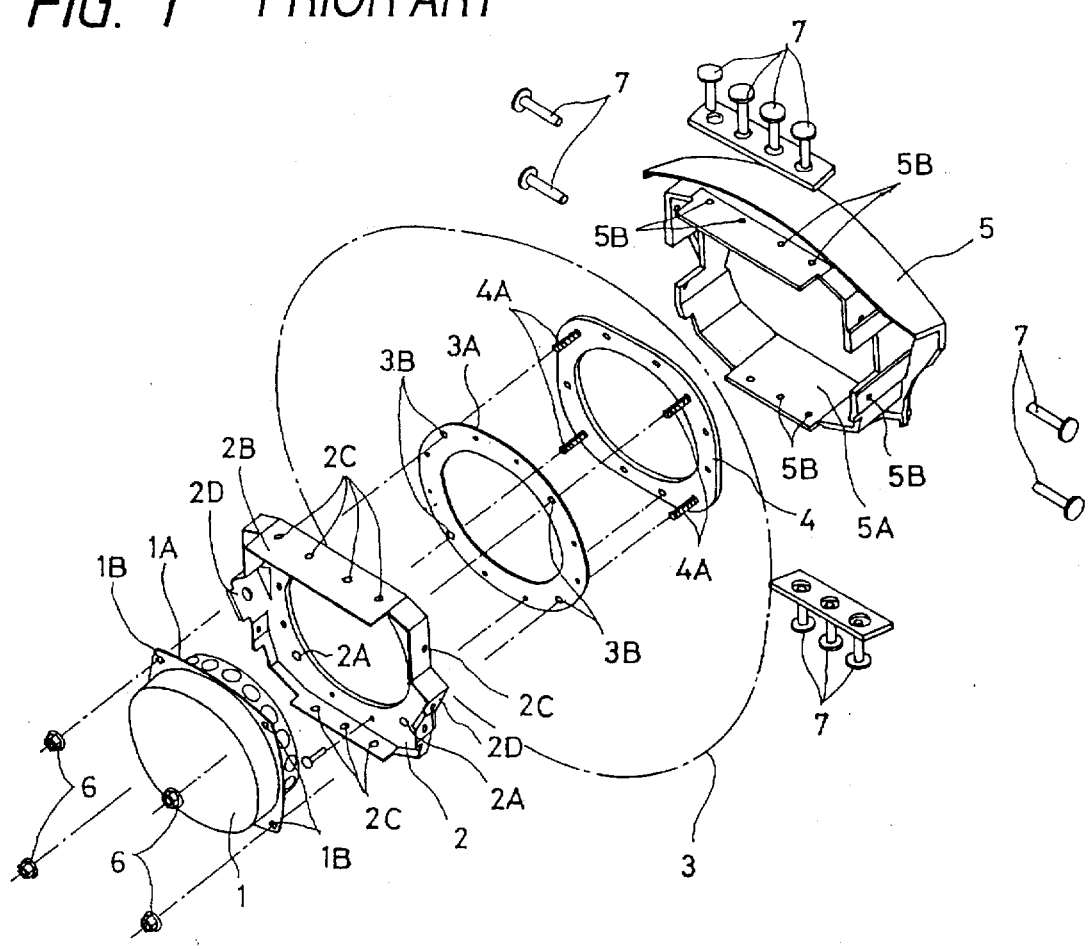
FIG. 1 is an exploded perspective view showing members configuring a conventional air bag apparatus.
Figure 2:
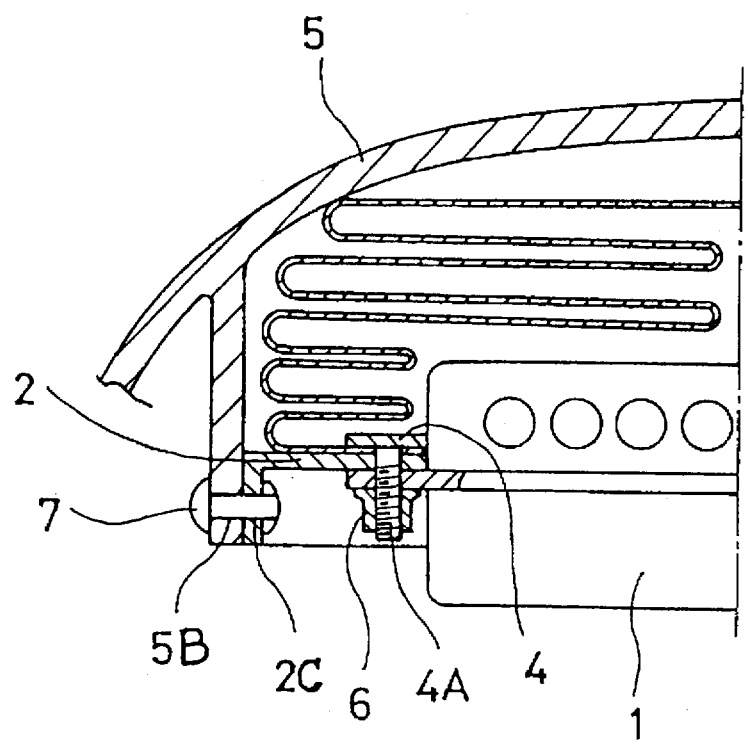
FIG. 2 is a sectional view showing-the main portion of the conventional air bag apparatus in an assembled state.
Figure 3:
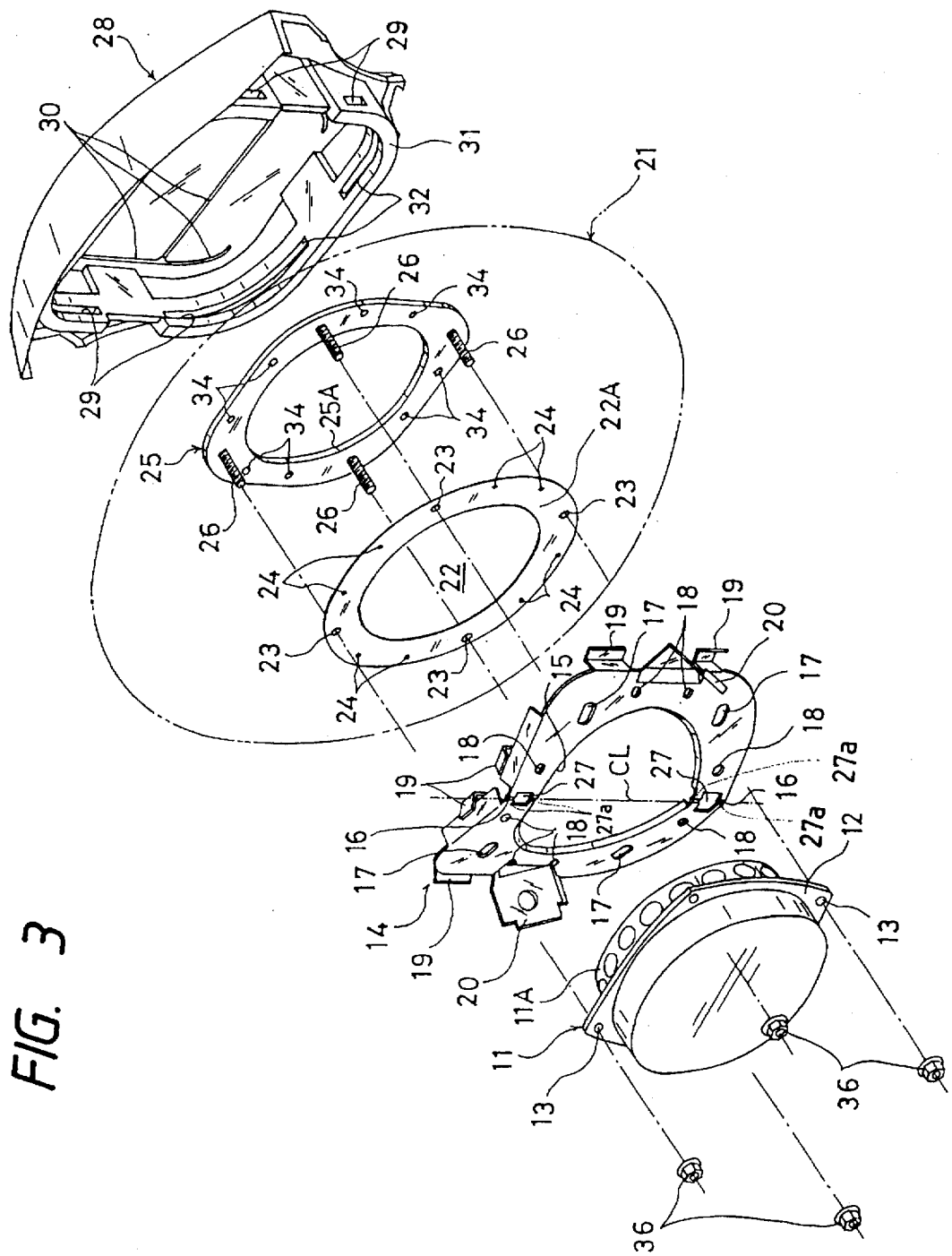
FIG. 3 is an exploded perspective view showing members configuring an air bag apparatus according to an embodiment of the invention.

In FIG. 3, reference numeral 11 designates an inflator which is similar to the inflator 1 of the prior art example. An approximately rectangular flange portion 12 is formed at the peripheral edge of the inflator 11. A mounting hole 13 is opened at each of the four corners of the flange portion 12.

Figure 4:
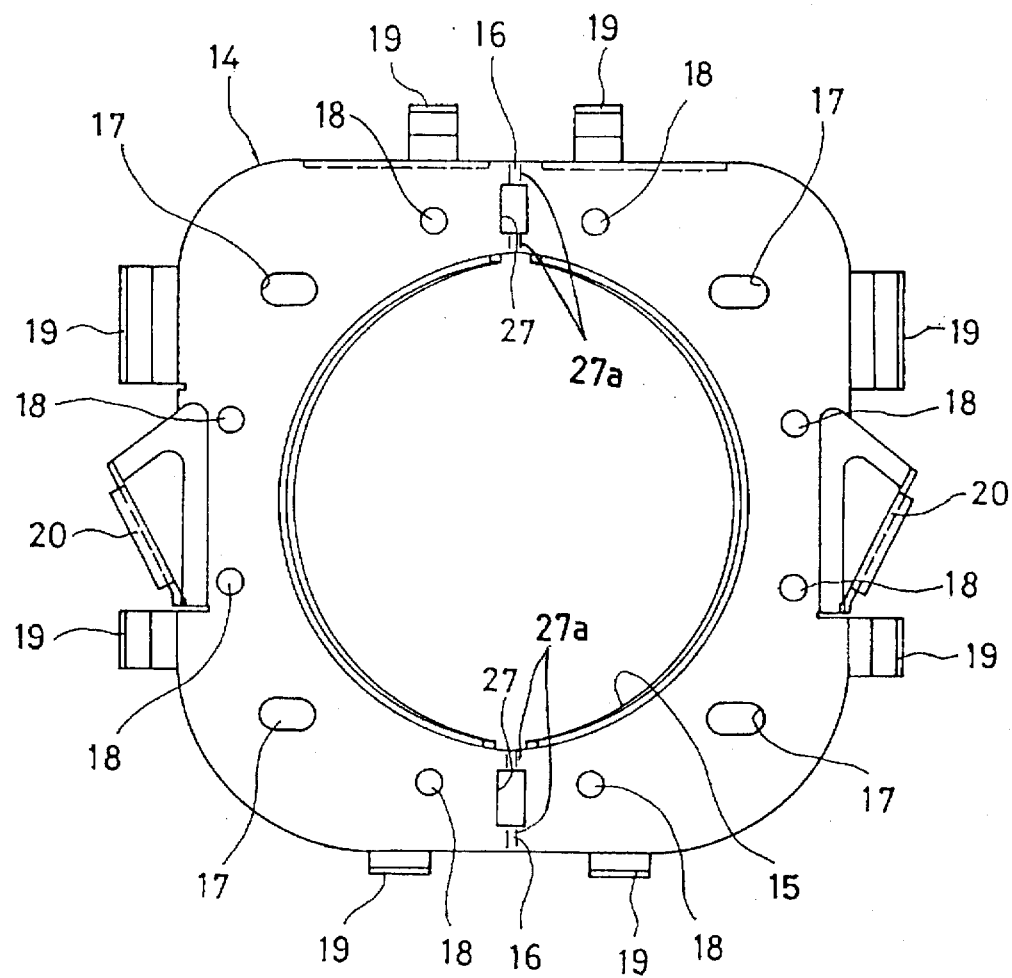
FIG. 4 is a plan view of a base member used in the embodiment of the invention.
Figure 5:
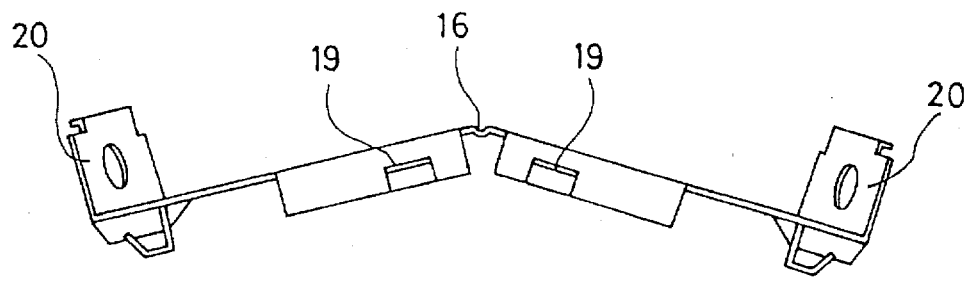
FIG. 5 is a side view of the base member used in the embodiment of the invention.
Figure 9:
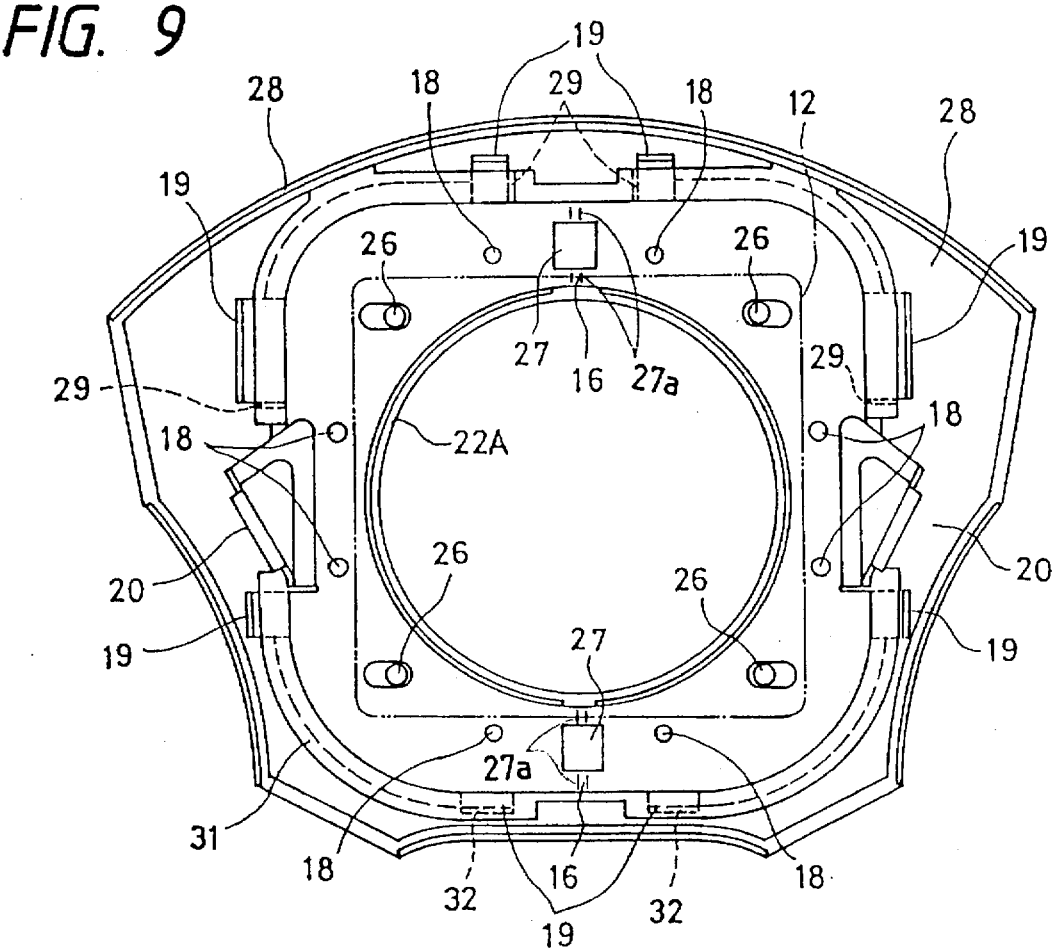
FIG. 9 is a plan view as seen from an arrow IX in FIG. 8.

Reference numeral 14 designates a base member. The base member 14 is configured so as to have an approximately non-planar shape in a side view as shown in FIGS. 4 and 5. Specifically, the base member 14 is configured by a plate member having an appearance of an approximately square shape. A circular fitting hole 15 into which a bulge portion 11A of the inflator 11 is to be fitted is formed in the center portion of the base member 14. A ridge portion 16 is formed in each of the upper and lower end portions of the base member 14 along the vertical center axis CL. The base member 14 is bent at the ridge portions 16 into an approximately non-planar shape in a side view or in a view as seen along the vertical center axis CL. In order to facilitate the operation of flattening the ridge portions 16 which will be described later, a weakening hole 27 and grooves 27a are formed in each of the ridge portions 16. Four bolt slots 17 which substantially correspond to the mounting holes 13 formed in the inflator 11, and rivet holes 18 for mounting the air bag are formed in the base member 14 so as to pass through the plate configuring the base member. The rivet holes 18 are opened at positions between the bolt slots 17. More specifically, the rivet holes 18 are opened at positions where, when the base member 14 is flattened as shown in FIG. 9, the holes do not interfere with the flange portion 12 of the inflator 11. Engaging claws 19 and mounting parts 20 are formed on the upper, lower, right, and left side edges of the base member 14. The engaging claws 19 have an approximately U-like shape and are to engage with an air bag cover 28 which will be described later. The mounting parts 20 are used for fixing the base member 14 to the steering unit which is not shown.

Returning to FIG. 3, reference numeral 21 designates the air bag body. An opening 22 through which a gas from the inflator 11 is to be introduced is formed in the center portion of the air bag body 21. Through holes 23 and 24 which respectively correspond to the bolt slots 17 and rivet holes 18 formed in the base member 14 are formed in a peripheral edge 22A of the opening 22.

Reference numeral 25 designates a ring-like retainer having a circular fitting hole 25A into which the bulge portion 11A of the inflator 11 is to be fitted. Four bolts 26 which pass through the mounting holes 13, the slots 17, and the through holes 23 are respectively protruded from the four corners of a side face of the retainer 25 so as to be integrated with the retainer 25. Rivet holes 34 which substantially correspond to the rivet holes 18 and the through holes 24 are opened at positions between the bolts 26. Reference numeral 28 designates the air bag cover which is made of a resin. A flange portion 31 is molded on the rear face of the air bag cover 28 so as to be integrated with the air bag cover. The flange portion 31 has an inner diameter which allows the base member 14 in a flattened state to be fitted into the flange portion 31. Engaging holes 29 and engaging grooves 32 which are to engage with the engaging claws 19 disposed on the base member 14 are formed in the upper, lower, right, and left wall faces of the flange portion 31. It should be noted that the engaging holes 29 may be formed into grooves and the engaging grooves 32 may be formed into holes. A breakaway groove 30 of an approximately H-like shape is formed on the rear face of the air bag cover 28 and inside the flange portion 31. The breakaway groove 30 will be broken by an inflating pressure of the air bag body 21 which is inflated by the gas of the inflator 11, thereby allowing the air bag body 21 to expand toward the driver.

The components of the air bag apparatus of the embodiment have the structures described above. Next, the procedure of assembling the components will be described. The retainer 25 is placed in the air bag body 21 which is appropriately folded, through the opening 22 of the air bag body 21. The bolts 26 of the retainer 25 are protruded through the respective holes 23 of the air bag body 21 toward the outside of the air bag body. The protruded portions of the bolts 26 are passed through the respective bolt slots 17 opened in the base member 14, and the peripheral edge 22A of the opening of the air bag body 21 is sandwiched between the retainer 25 and the base member 14.

Figure 6:
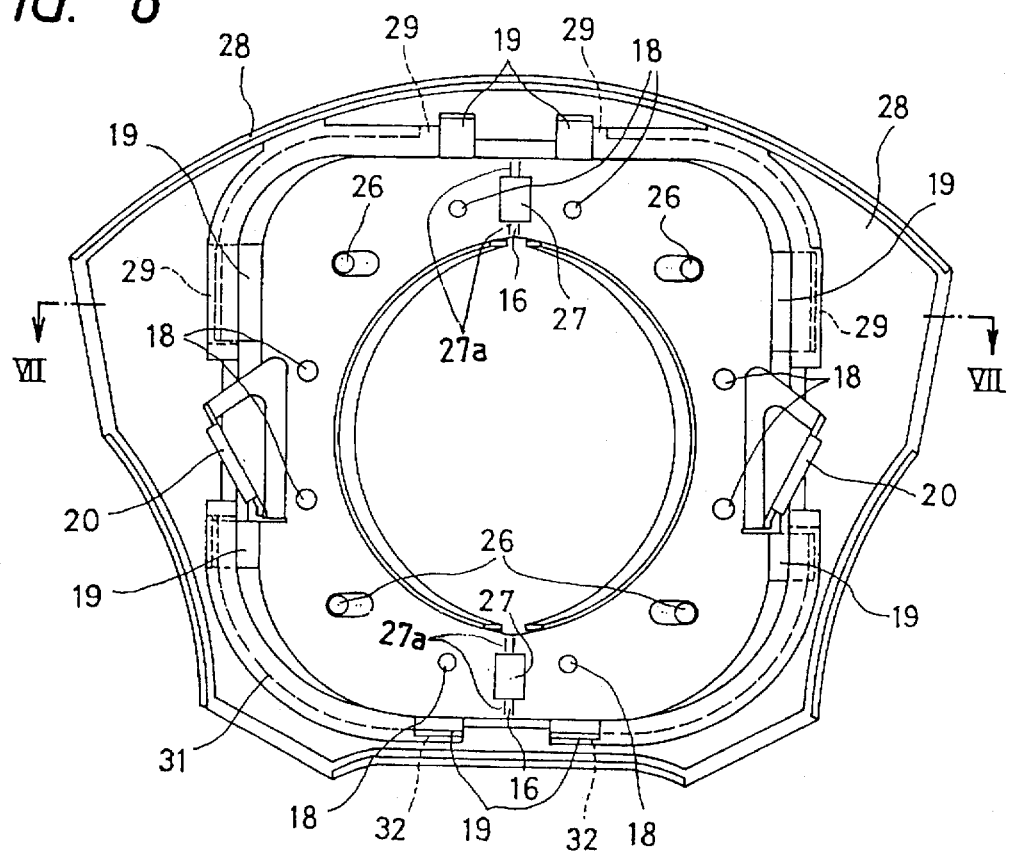
FIG. 6 is a plan view showing a state in which the air bag body, a retainer, and the base member are assembled into an air bag cover in the embodiment of the invention.
Figure 7:
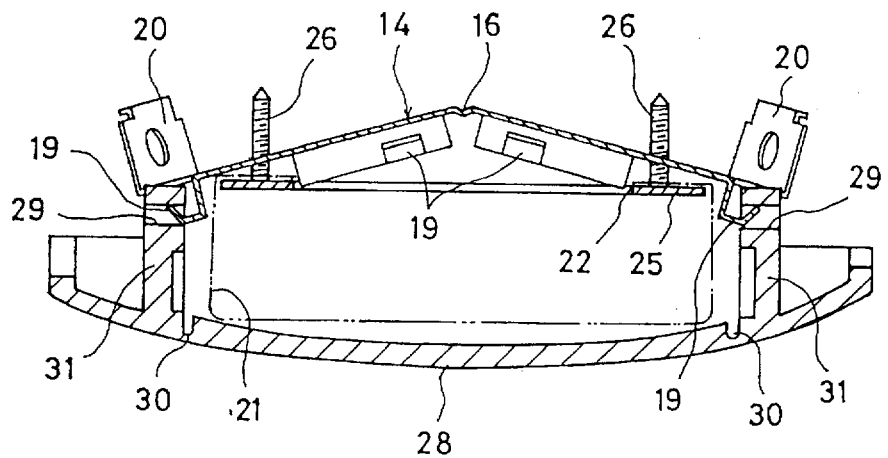
FIG. 7 is a sectional view taken along line VII—VII in FIG. 6.

Next, the air bag body 21 is placed so as to be housed in the flange portion 31 of the air bag cover 28, and the tip ends of the right and left engaging claws 19 of the base member 14 are inserted into the engaging holes 29 formed in the right and left wall faces of the flange portion 31. FIGS. 6 and 7 show this state.

At this time, the base member 14 remains in the bent state where the approximately non-planar shape in a side view is attained. Therefore, the work of inserting the right and left engaging claws 19 of the base member 14 into the engaging holes 29 formed in the right and left wall faces of the flange portion 31 and provisionally engaging the claws with the holes can be easily conducted.

Figure 8:
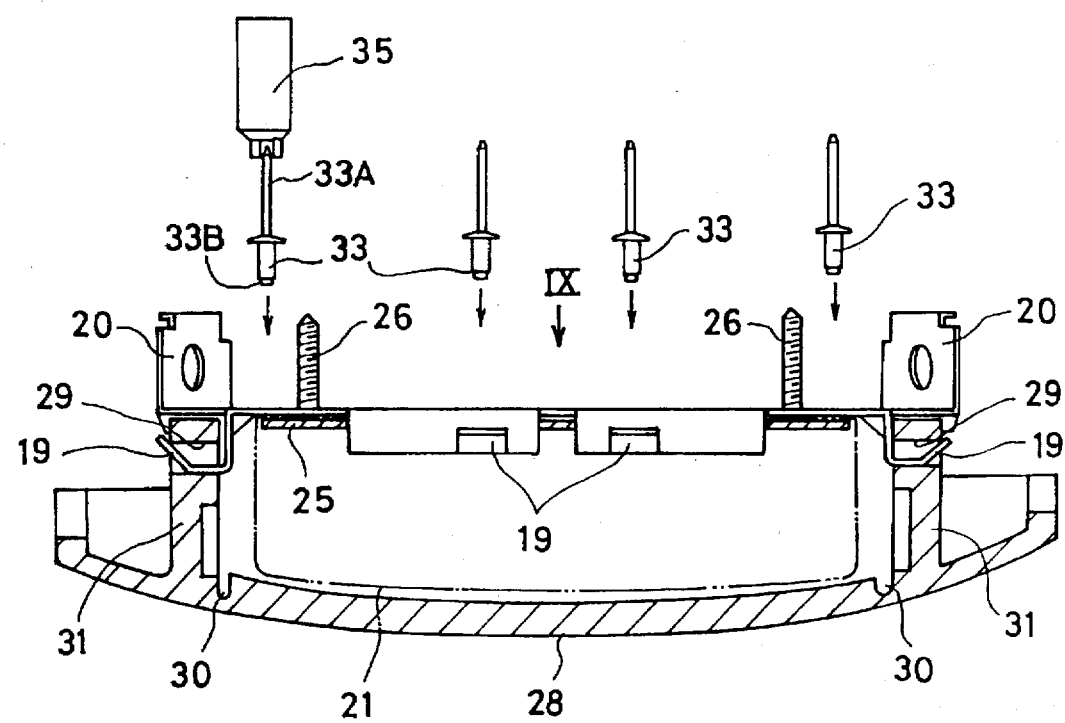
FIG. 8 is a diagram illustrating the manner of joining the air bag body, the retainer, and the flattened base member to each other by using blind rivets in the embodiment of the invention.

Thereafter, the base member 14 is pressed from the direction along which the ridge portions 16 are protruded, so that the base member 14 is flattened. As shown in FIGS. 8 and 9, this operation of pressing and flattening the base member 14 causes the right and left engaging claws 19 disposed on the base member 14 to enter the engaging holes 29 formed in the flange portion 31 of the air bag cover 28 and engage therewith, thereby attaining the normal engagement. At this time, also the upper and lower engaging claws 19 disposed on the base member 14 enter the recesses of the air bag cover 28, including the engaging holes 29 and engaging grooves 32 formed in the upper and lower wall faces of the flange portion 31 of the air bag cover 28, while outward pushing the upper and lower wall faces. This causes the base member 14 to be integrally joined to the air bag cover 28 as shown in FIG. 9.

Next, as shown in FIG. 8, a number of mandrel drawing type blind rivets 33 are passed through the respective combinations of the rivet holes 18 of the base member 14, the through holes 24 of the air bag body 21, and the rivet holes 34 of the retainer 25 which are made coincident with each other. The shank 33A of each of the blind rivets 33 is removed away by using a tool 35 so that only the head 33B remains to exist. As a result, the three members, i.e., the base member 14, the air bag body 21, and the retainer 25 are integrally joined to each other by the rivets 33.

Figure 10:
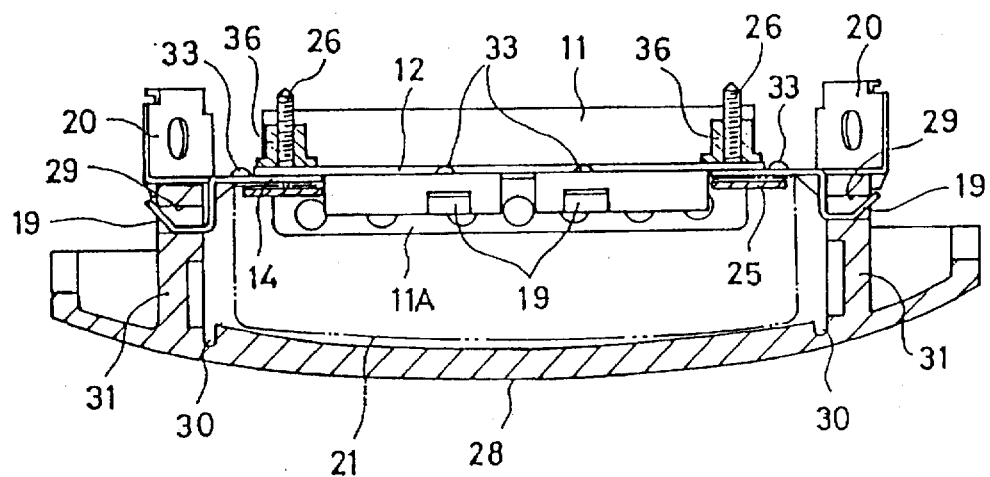
FIG. 10 is a view illustrating a sectional structure of the completed air bag apparatus according to the embodiment of the invention.

Next, as shown in FIG. 10, the inflator 11 is attached while the bolts 26 protruded from the retainer 25 are passed through the mounting holes 13 formed in the flange portion 12 of the inflator 11, respectively. Thereafter, nuts 36 are fastened to the bolts 26, thereby joining the inflator 11 to the above-mentioned joined unit, with the result that the objective air bag apparatus for an automobile is obtained.

The flattened state of the base member 14 which is flattened at the above-described process is maintained by fastening the inflator 11. Therefore, the state of joining the air bag body 28 to the base member 14 can be held at a sufficient strength.

The air bag apparatus is fixed by screws or the like to the steering unit which is not shown, by using the mounting parts 20, thereby obtaining a driver-side air bag apparatus.

In the above, the embodiment of the invention has been described with reference to the drawings. However, the specific configuration is not restricted to the embodiment. The invention may be variously modified without departing from the spirit of the invention, and such modifications are within the scope of the invention. In the embodiment, for example, two types of means, or the engaging holes 29 and engaging grooves 32 disposed in the flange portion 31 of the air bag cover 28 are used as the means for engaging the air bag cover 28 with the base member 14. Alternatively, the engagement means may be configured only by the engaging holes 29. A slide core mold for forming engagement means having holes disposed in the flange portion 31 can be made simpler in structure than that for forming engagement means having grooves in the flange portion. Therefore, the alternative can provide an air bag apparatus which is more excellent in the economical view point. In the embodiment, the engaging claws 19 of the base member 14 are configured so as to have an approximately U-like shape, and two engaging claws 19 are disposed on each of the upper, lower, right, and left sides. The number of the engaging claws may be suitably increased or decreased. The engaging claws may have a shape of a protrusion piece which protrudes from each side of the base member 14 along the direction of the plate face.

As described above, according to the invention, the engaging claws 19 which are to engage with the air bag cover 28 are disposed on the base member 14 which cooperates with the retainer ring 25 to hold the air bag body 21, and the base member 14 is previously formed into an approximately non-planar shape in a plan view so that the lateral width of the base member is relatively reduced. After the base member 14 is fitted into the air bag cover 28, the lateral width of the base member 14 is increased by flattening the member, thereby holding the joint of the engaging claws and the air bag cover. When the air bag cover is to be joined to the base member, therefore, the air bag cover can be integrally joined to the base member by a simple work in which the base member is placed inside the air bag cover and the base member formed into an approximately non-planar shape in a side view is then flattened.

Unlike the conventional apparatus, rivet members are not required to be used as means for fixing the air bag cover to the base member, and the step of mounting the rivet members can be eliminated. Therefore, the assembling work can be easily conducted, and the reduction of the number of parts to be used improves remarkably the economical efficiency and the assembly workability.

Since the flattened state of the base member can be kept by fastening the inflator, the joined state of the base member and the air bag cover can be permanently ensured.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An air bag apparatus for an automobile, comprising:
   an inflator;
   an air bag body including an opening through which a gas from said inflator is introduced therein, and a peripheral edge member defining said opening;
   a retainer disposed inside said peripheral edge member of said opening;
   a base member disposed outside said peripheral edge member and having first engaging means, said peripheral edge member being interposed between said retainer and said base member;
   an air bag cover for covering said air bag body, said air bag cover having second engaging means which is engaged with said first engaging means of said base member in a state where said base member has been fitted into said air bag cover; and means for fastening said inflator to said retainer through said base member and said peripheral edge member;

wherein said base member is bent into a non-planar shape before said base member is fitted into said air bag cover, and is flattened after said base member is fitted into said air bag cover, and said fastening means maintains a flattened state of said base member.

2. An air bag apparatus as claimed in claim 1, wherein said inflator includes a flange portion through which a plurality of holes are defined, said retainer includes a plurality of bolts protruded therefrom, said base member defines a plurality of slots therein, said peripheral edge member of said air bag body defines a plurality of holes therein, and said fastening means comprises said flange portion, said bolts which are passed through the holes of said flange portion, the slots of said base member and the holes of said peripheral edge member, and a plurality of nuts which are fastened to said bolts to join said inflator to said retainer through said base member and said peripheral edge member.

3. An air bag apparatus as claimed in claim 1, wherein said first engaging means of said base member comprises a plurality of engaging claws, and said second engaging means of said air bag cover comprises a plurality of recesses for receiving said engaging claws.

4. An air bag apparatus as claimed in claim 1, wherein said base member has a ridge portion formed in each of upper and lower end portions thereof along a center axis so that said base member is bent at the ridge portions into the non-planar shape.

5. An air bag apparatus as claimed in claim 4, wherein said ridge portions include weakening holes that facilitate the operation of flattening the base member.

6. An air bag apparatus as claimed in claim 4, wherein said ridge portions further include grooves that facilitate the operation of flattening the base member.

7. A method of assembling an air bag apparatus for an automobile, which includes an inflator; an air bag body including an opening through which a gas from said inflator is introduced therein, and a peripheral edge member defining said opening; a retainer disposed inside said peripheral edge member of said opening; a base member disposed outside said peripheral edge member and having first engaging means, said peripheral edge member being interposed between said retainer and said base member; an air bag cover for covering said air bag body, said air bag cover having second engaging means which is engaged with said first engaging means of said base member in a state where said base member has been fitted into said air bag cover; and means for fastening said inflator to said retainer through said base member and said peripheral edge member; said method comprising the steps of:

interposing said air bag body between said retainer and said base member with said base member bent into a non-planar shape;

placing said air bag body together with said base member and said retainer inside said air bag cover while maintaining the non-planar bent shape of said base member;

pressing said base member into a flattened state so that said first engaging means of said base member are fastened to said second engaging means of said air bag cover; and fastening said inflator to said retainer through said base member and said peripheral edge member by said fastening means to maintain said base member in the flattened state.

* * * * *